Oct. 2, 1945.  G. HERZOG  2,385,857
CUSHIONING DEVICE FOR RADIATION DETECTORS
Filed Jan. 29, 1944
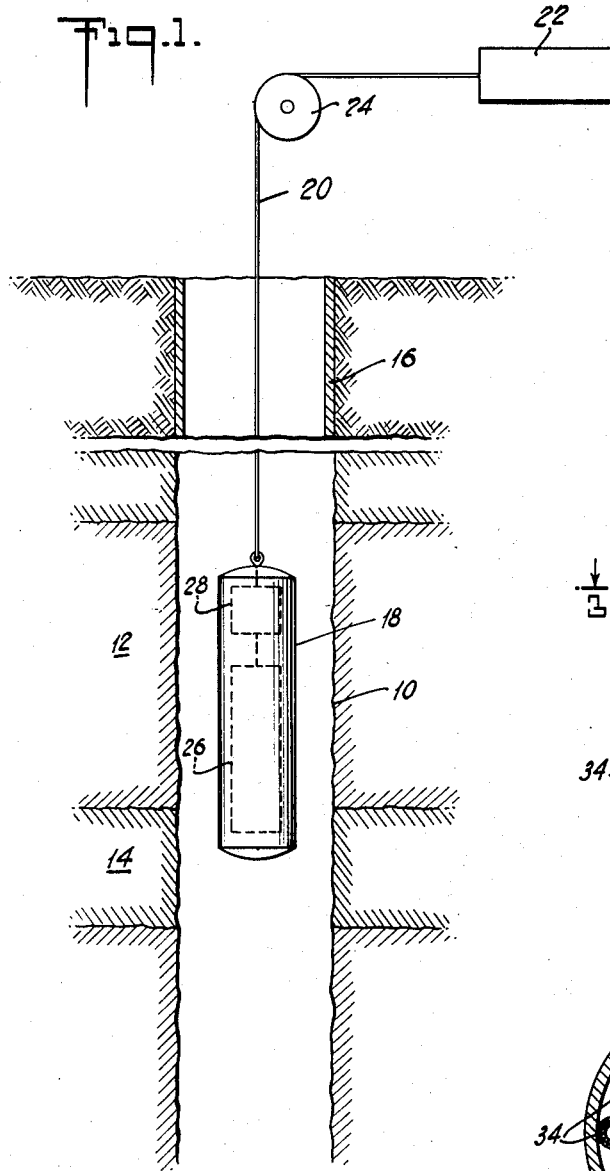
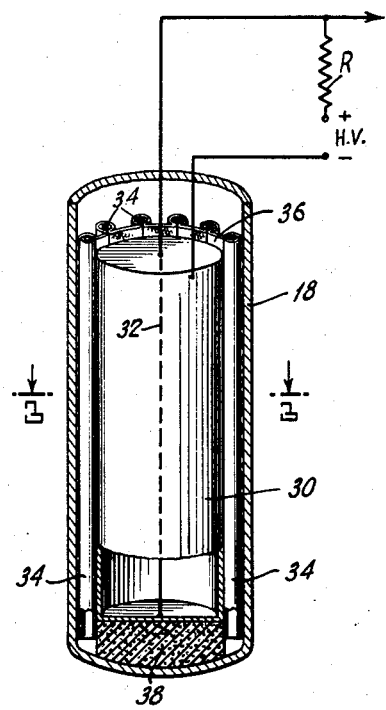
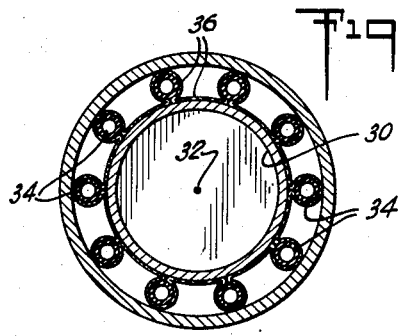
INVENTOR
GERHARD HERZOG.
BY
ATTORNEY Patented Oct. 2, 1945

2,385,857

UNITED STATES PATENT OFFICE 2,385,857

CUSHIONING DEVICE FOR RADIATION DETECTORS

Gerhard Herzog, Houston, Tex., assignor to The Texas Company, New York, N. Y., a corporation of Delaware Application January 29, 1944, Serial No. 520,238

6 Claims. (Cl. 250—83.6)

This invention relates to instruments for measuring radiation intensities and more particularly to means for cushioning a radiation detector which is used in well logging so that mechanical socks or jars which may occur when the instrument housing strikes against the casing or the walls of a bore hole will not produce inaccuracies in the well log, the elimination of which would otherwise require that a low logging speed be used.

In order to determine the nature and location of the formations or substrata through which a bore hole has been drilled, radioactivity logs are frequently made. In one method, an instrument capable of detecting gamma radiation is passed through the bore hole attached to a suspending cable, the instrument being connected through the cable to a suitable recording device at the surface by means of which a record is made of the intensity of the natural radiation of the various strata traversed by the hole. The depth or position of the detecting instrument in the hole is correlated with the intensity record and in this manner valuable information may be obtained as to the nature and location of the various strata.

In another method, a source of radiation, together with a radiation detector, is passed through the hole, the detector being responsive to radiation from the source which penetrates the surrounding formations and some of which is scattered and returned to the detecting instrument in the hole. The amount of returned, scattered radiation depends, to a large extent, on the nature of the formation opposite the source and detector, and in this manner a log or record may be obtained showing the nature and location of the various formations.

As instruments for detecting radiation, Geiger-Muller counters, proportional counters or ionization chambers can be used. In all three cases ions are set free in a gas in the detector through the action of gamma rays or neutrons and this ionizing may be a direct ionization of the gas or it may be a secondary ionization due to the action of charged particles which are emitted from the walls of the container. Structurally the three instruments mentioned may be quite similar and comprise essentially two electrodes, one, usually the ctahode, being often in the form of a thin metal cylinder and the other, the anode, taking the form of a fine wire spanned axially through the cylinder and insulated therefrom. The wire anode is maintained at a positive potential with respect to the cylinder, and measurements are made of the potential drop across a resistance placed in the electrode circuit. In the ionization chamber a small metallic rod is sometimes used as the center electrode instead of a wire.

In the ionization chamber the penetrating rays ionize the gas and due to the voltage supplied between the electrodes a small current proportional to the intensity of the radiation is generated.

In the Geiger-Muller counter and in the proportional counter a multiplication of the ions occurs within the detector, and the charge which is collected on the anode is much larger than in the ionization chamber. In the Geiger-Muller counter and the proportional counter the potential difference between the cathode and anode is nearly, but not quite, high enough to cause a discharge to take place. When a penetrating ray capable of ionizing the gas passes through the instrument, a discharge may take place with a current flow of the order of a few microamperes. This causes a large voltage drop across the resistance connected in circuit, and by suitably amplifying these voltage drops a mechanical recorder or other device may be actuated to register the number of discharges.

In well logging it has been found, particularly in connection with Geiger-Muller counters and proportional counters, that when the logging instrument strikes an object such as the casing or a hard portion of the walls of the well bore, the resulting shock or jar frequently causes relative movement between the anode wire and the cathode of the detector and a spurious or unwanted discharge of the detector occurs. These discharges will, of course, appear on the log and may confuse the record so that inaccurate interpretations will be made. In order to minimize these discharges, it has been necessary, in passing the logging instrument through the hole, to do so at a comparatively low speed so that jarring of the instrument will be less violent.

In accordance with the invention, means are provided for resiliently supporting and cushioning the detector within the instrument housing so that when the housing is jarred, as has been described, these jars will be absorbed so that there will be insufficient relative movement between the detector anode and cathode to cause discharges of the detector. In this manner the instrument may be passed through the hole at a much higher speed with an attendant saving in time and cost of the logging operation. As the resilient medium, a plurality of small tubes of rubber or some similar substance are placed substantially parallel and longitudinally between the outside of the detector and the inner surface of the instrument housing. These lengths of resilient tubing may be attached to or sewed in a sleeve of a suitable fabric, which sleeve can be pulled over the detector which is then inserted in the housing. With the radiation detector cushioned in this manner, logging speeds of 6000 feet per hour, or higher, are possible without the occurrence of inaccuracies in the log due to jarring of the detector.

For a better understanding of the invention reference may be had to the accompanying drawing in which:

Figure 1 is a sectional elevation showing a bore hole penetrating a portion of the earth's substrata with a radiation detecting instrument suspended in the hole;

Figure 2 is a vertical section through that portion of the instrument containing the radiation detector; while Figure 3 is a section taken on the line 3—3 of Figure 2.

Referring to the drawing and particularly to Figure 1 thereof, a bore hole 10 is shown as traversing a plurality of formations or substrata such as those indicated at 12 and 14. A casing 16 is shown in the upper part of the hole and it is to be understood that the casing can extend throughout the entire hole since a radio-activity log can be made regardless of whether or not the hole is cased.

A logging instrument, indicated generally by the housing 18, is shown as being passed through the hole 10 suspended from a cable 20, the other end of the cable being connected to a suitable indicating or recording device 22 at the surface. The cable 20 may pass over the pulley or drum of a device 24 which serves to measure the length of cable run into the hole and thus to provide a continuous indication of the depth or position of the instrument 18 in the hole. Within the housing 18 is a radiation detector 26, shown more clearly in Figure 2, and the detector output is preferably conducted to a preamplifier 28 connected in turn to the lower end of the cable 20. It is understood that the cable 20 conducts the output of the preamplifier 28 to the recorder 22 at the surface and may also conduct downwardly to the instrument 18 electric current necessary to energize the detector 26 and the circuits of the preamplifier.

The detector 26 is shown in Figures 2 and 3 as comprising a thin metal cylinder 30 and a fine wire 32 stretched along the longitudinal axis of the cylinder. The cylinder 30 is connected preferably to the negative side of a source of relatively high potential of the order, for instance, of 1000 volts, and the wire 32 is connected through a fairly high resistance R to the positive side of the voltage supply. In this manner the cylinder 30 forms the cathode of the detector while the wire 32 becomes the anode. The showing of the detector in Figure 2 is quite diagrammatic and it is to be understood that the cylinder 30 is closed at each end and that provision is made for electrically insulating the anode 32 from the cathode cylinder. The cylinder contains a suitable ionizable gas at a fairly low pressure of a few centimeters of mercury when the detector is constituted as an instrument of the Geiger-Muller type. The potential difference between the cathode 30 and the anode 32 is nearly, but not quite, high enough to cause an electrical discharge to take place, and, if a particle or ray capable of ionizing the gas passes through the cylinder, a discharge will take place with a current flow of a few microamperes. This current causes a large voltage drop across the resistance R which is amplified by means of the preamplifier 28 and recorded by means of the device 22. If desired, of course, an additional amplifier may be placed in the circuit between the preamplifier 28 and the recorder 22. When the instrument 18 containing the detector 26 is lowered or raised through the hole 10, the detector will respond to the natural radiation of the surrounding formations and, as is well known, the natural radiation of any formation such as that indicated, for instance, at 14 will depend upon the nature of that formation and may vary materially from the radiation intercepting the hole from the adjacent formations. Thus, the record made by the device 22 when correlated with the measurement showing the depth of the instrument in the hole will provide an indication of the nature of the formations and their location.

Obviously when the instrument 18 is being lowered or raised through the hole, it will be quite apt to strike against the walls of the hole or the casing 16 and this may produce an appreciable mechanical shock or jarring of the detector. Since, as has been pointed out hereinbefore, the potential difference between the cathode 30 and the anode 32 is just below that which would be necessary to produce a discharge of the detector, relative movement between the anode wire 32 and the cylinder 30 may change the strength of the electric field sufficiently to produce a discharge of the detector. These discharges accidently produced by the jarring of the instrument when striking the walls of the hole will, of course, be registered in the record produced by the device 22 along with the discharges caused by the radiation intercepted from the formations surrounding the hole, with the result that confusion may result in the record such as will render the proper interpretation thereof difficult, if not impossible.

In order to prevent appreciable relative movement between the anode wire 32 and the cathode 30 with attendant spurious detector discharges when the instrument strikes the walls of the hole 10 or the casing 16, means are provided for cushioning the detector within the housing of the instrument 18. Various types of cushioning materials and resilient mountings have been tried with varying degrees of success. It has been found that a plurality of lengths of rubber tubing 34, when placed substantially parallel and lengthwise so as to contact both the exterior of the detector 26 and the interior of the housing 18, will so cushion the detector as to prevent the unwanted discharges which might otherwise occur. As is shown in Figures 2 and 3, the lengths of tubing 34 are placed around the detector in more or less uniformly spaced, parallel relation and the diameter of the tubing is of course chosen such that the detector will be supported snugly within the housing 18. Sudden jars of the housing 18 are absorbed by the lengths of tubing 34 so that there is substantially no vibration or other movement of the anode wire 32 with respect to the cathode cylinder 30, and undesired discharges of the detector are thereby prevented. If desired, a piece of sponge rubber 38 may be placed in the bottom of the housing 18 to provide additional support to the detector.

In the preferred form, the lengths of tubing 34 are supported in spaced relation as by sewing to or in a sleeve 36 of a suitable fabric, the diameter of the sleeve being such that it can be pulled snugly over the detector 26 and the detector and surrounding sleeve then slid into the housing 18.

Although it is preferred to use the parallel lengths of tubing, as has been described, one or more lengths of the tubing may be wound around the detector in the form of a spiral and the detector then slipped into the housing. Again, it may be desired to fill the tubing with a gas to a predetermined pressure, the tubing ends being suitably sealed, of course, as by winding with cord or wire.

Although a radiation detector of the Geiger-Muller type has been described, it is to be understood that the detector may be constituted in other forms such as that of a proportional counter or an ionization chamber. As a proportional counter, the cushioning of the detector will prevent discharges of the instrument in substantially the same way as described with respect to a detector of the Geiger-Muller type.

Although the instrument has been described in connection with the measuring of the natural radioactivity of the formations such as 12 and 14, it is also to be understood that the housing 18 may contain a source of radiation, such as a mixture of radium and beryllium, capable of producing neutrons which would penetrate and be scattered in the formation surrounding the hole and returned to the detector. The amount of returned neutrons intercepting the detector will depend upon the nature of the formations traversed by the bore hole so that the resulting log can be used in determining the location and nature of these formations. Likewise, scattered gamma rays, as well as gamma rays produced by interaction between neutrons and the atoms of the material constituting the formations, can also be measured, and it is contemplated that the invention which has been described will be applicable with any of these methods wherein a radiation detecting instrument is adapted to be passed through a bore hole.

It is also contemplated that the cushioning of a radiation detector to prevent unwanted discharges or increases in the detector response will be useful where a detector is utilized in methods other than in connection with the logging of a bore hole. Thus, the response of a radiation detector carried in a vehicle such as an automobile or truck may be affected by jars due to the unevenness of the road over which the vehicle is passing, and by cushioning the detector, as has been described, spurious discharges can be prevented.

Obviously many modifications and variations of the invention, as hereinbefore set forth, may be made without departing from the spirit and scope thereof, but only such limitations should be imposed as are indicated in the appended claims.

I claim:

1. In a device for determining the nature and location of underground formations traversed by a bore hole, a housing adapted to be passed through said hole on a suspending cable, a radiation detector within the housing of the type in which electrical discharges are produced when radiation from the formations is intercepted, means for preventing unwanted detector discharges caused by mechanical shocks occurring when the housing is jarred by striking other objects while passing through the hole, said means comprising a plurality of strips of resilient material, said strips disposed longitudinally between the housing and the detector, so as to support the detector resiliently from the housing, said resilient strips serving to absorb said shocks caused by jarring of the housing.

2. In a device for measuring the radioactivity of substrata traversed by a bore hole, a housing adapted to be lowered through said hole on a suspending cable, a radiation detector in said housing in which electrical currents are produced when radiation from the formations is intercepted by the detector, means for preventing the production of said currents caused by mechanical shocks occurring when the housing is jarred by contact with walls of the hole during the lowering operation, said means comprising a plurality of strips of resilient tubing, said strips disposed longitudinally between the housing and the detector, so as to support and cushion the detector within the housing, said resilient strips serving to absorb said shocks caused by jarring of the housing.

3. In a device for measuring the radioactivity of substrata traversed by a bore hole, a housing adapted to be passed through said hole on a suspending cable, a radiation detector in which electrical discharges are produced when radiation from the substrata is intercepted, means for preventing unwanted detector discharges caused by mechanical shocks occurring when the housing is jarred by contact with the walls of the hole while passing therethrough, said means comprising a fabric sleeve adapted to be pulled over the detector, a plurality of lengths of resilient tubing attached to said sleeve and disposed lengthwise thereof, the arrangement being such that when the sleeve is placed around the detector and the detector placed in said housing the lengths of tubing space the detector from the housing and absorb the shocks caused by jarring of the housing.

4. In a device for measuring the radioactivity of substrata traversed by a bore hole, a housing adapted to be lowered through said hole on a suspending cable, a radiation detector in said housing of the type in which electrical pulses are produced when radiation from the formations is intercepted, means for preventing unwanted detector pulses caused by the mechanical shocks occurring while the housing is passing through the hole, said means comprising a sleeve adapted to be fitted snugly over the detector, a plurality of lengths of resilient tubing attached to said sleeve and disposed substantially in parallel and lengthwise thereof, the arrangement being such that when the sleeve with the lengths of tubing is placed around the detector and the detector placed in said housing the tubing cushions the detector and absorbs said shocks.

5. In a device for measuring the radioactivity of substrata traversed by a bore hole, a housing adapted to be passed through said hole on a suspending cable, a detector mounted in said housing comprising an elongated cathode member, and an anode member disposed lengthwise of and parallel to said cathode and insulated from said cathode, a high potential connected across said cathode and anode and an ionizable gas within the detector whereby intercepted radiation causes ionization of said gas with the production of current discharges, means for preventing discharges of said detector caused by relative movement between said anode and cathode when the housing is jarred as by contact with the walls of the hole while passing therethrough, said means comprising a plurality of lengths of resilient tubing arranged substantially in parallel to each other and to the longitudinal axis of said detector, and disposed between the side walls of said detector and said housing for absorbing shocks caused by said jarring of the housing.

6. In a device for measuring the radioactivity of substrata traversed by a bore hole, a housing adapted to be passed through said hole on a suspending cable, a detector mounted in said housing comprising an elongated, substantially cylindrical cathode member and an anode member formed of a wire disposed lengthwise within and parallel to said cathode and insulated from said cathode, a high potential connected across said cathode and anode and an ionizable gas within said cathode whereby intercepted radiation causes ionization of said gas with the production of current discharges, means for preventing unwanted discharges of said detector caused by relative movement between said anode and cathode when the housing is jarred by contact of said housing with the walls of the hole while passing therethrough, said means comprising a fabric sleeve adapted to be pulled over the detector, a plurality of lengths of resilient tubing attached to said sleeve and disposed lengthwise thereof, the arrangement being such that when the sleeve is placed around the detector and the detector placed in said housing the lengths of tubing absorb the shocks caused by jarring of the housing.

GERHARD HERZOG.